United States Patent
Murray

(10) Patent No.: US 8,615,787 B2
(45) Date of Patent: Dec. 24, 2013

(54) SECURE INTERNET TRANSACTION METHOD AND APPARATUS

(75) Inventor: Bruce Murray, Hamburg (DE)

(73) Assignee: NXP B.V., Eindhoven (NL)

( * ) Notice: Subject to any disclaimer, the term of this patent is extended or adjusted under 35 U.S.C. 154(b) by 1193 days.

(21) Appl. No.: 12/302,156

(22) PCT Filed: May 15, 2007

(86) PCT No.: PCT/IB2007/051834
§ 371 (c)(1),
(2), (4) Date: Nov. 24, 2008

(87) PCT Pub. No.: WO2007/135619
PCT Pub. Date: Nov. 29, 2007

(65) Prior Publication Data
US 2009/0147957 A1   Jun. 11, 2009

(30) Foreign Application Priority Data
May 22, 2006   (EP) .................................. 06114323

(51) Int. Cl.
*H04L 29/06*   (2006.01)
*G06F 21/00*   (2013.01)

(52) U.S. Cl.
USPC ............................................. 726/2; 380/281

(58) Field of Classification Search
USPC ............................................. 726/2; 380/281
See application file for complete search history.

(56) References Cited

U.S. PATENT DOCUMENTS

| | | | |
|---|---|---|---|
| 6,223,287 B1 | 4/2001 | Douglas et al. | |
| 7,130,910 B2 | 10/2006 | Urien | |
| 2001/0016877 A1* | 8/2001 | Dancs et al. ................... | 709/227 |
| 2002/0123972 A1* | 9/2002 | Hodgson et al. ................ | 705/72 |
| 2002/0138549 A1 | 9/2002 | Urien | |
| 2003/0088780 A1* | 5/2003 | Kuo et al. ...................... | 713/185 |
| 2004/0250066 A1 | 12/2004 | Di Luoffo et al. | |
| 2005/0216736 A1* | 9/2005 | Smith ........................... | 713/168 |

FOREIGN PATENT DOCUMENTS

| | | |
|---|---|---|
| EP | 0932956 B1 | 8/1999 |
| EP | 1349032 B1 | 10/2003 |
| WO | 0205476 A1 | 1/2002 |
| WO | 2005034052 A1 | 4/2005 |
| WO | 2006021865 A | 4/2005 |

OTHER PUBLICATIONS

Badra, Mohamad, et al; "Toward SSL Integration in Sim Smartcards"; IEEE Communication Society 2004; p. 889-894.

* cited by examiner

*Primary Examiner* — Lisa Lewis

(57) ABSTRACT

This invention provides for a transaction card for use at a terminal and for initiating an internet transaction with a SSL protected server, wherein the card comprises a smartcard including an application arranged for extending an SSL connection from the said protected server into the smartcard and, further, the invention can provide for a related terminal, server and related transaction initiation and establishment methods, for extending the said SSL connection as noted above.

18 Claims, 2 Drawing Sheets

SECURE INTERNET TRANSACTION METHOD AND APPARATUS

FIELD OF THE INVENTION

The present invention relates to a method and related apparatus for providing secure internet transactions between server and client, wherein the client customer employs a card for initiating a transaction.

BACKGROUND OF THE INVENTION

As examples of such transactions, internet mail-order purchases form an increasingly important sector within the retail economy and are usually conducted by customers entering relevant details, such as credit card number, name etc, on a form-page of a vendor's website. Alternatively it is possible to rely on the vendor having stored those details from a previous transaction, so as to simplify subsequent purchases from that customer.

Security is of paramount importance in conducting such transactions, since access to the account details of a legitimate customer can be exploited for fraudulent purposes such as the manufacture of fake cards etc. If account details are transmitted over internet connections in an unencrypted form, an eavesdropper with access to an intermediate router can access these sensitive details. Alternatively, fake "look-a-like" websites can lure innocent customers into providing their account details in the belief that they are communicating with a reputable vendor. Finally, it is not usual for the web-servers of legitimate traders to become the subject of attacks, as a result of which databases of previously stored account details can be compromised.

To guard against many of these attacks, web-traders commonly employ Secure Sockets Layer (SSL)-protected servers. These address some, but not all, of the security threats by encrypting communications between the customer and the web-server, and also serve to ensure that the web-server must present a digital certificate which associates its identity with a cryptographic public key.

However, even when using the SSL protocol, some threats, for example, rogue processes running on a customer's PC or other terminal device can act so as to harvest card details and transmit them to an attacker. Such danger arises particularly if the customer's device does not have adequate firewall software which monitors outgoing traffic. Also, most users, unfamiliar with digital certificates and how to check them, and with network security etc. in general, can still be fooled, by disguised urls etc, into believing that they are communicating with a reputable vendor rather than an attacker's website.

It is also noted that many customers find the process of entering details on web-forms confusing and error prone, and the invention serves to ease these difficulties also.

From published International patent application WO-A-02/05476 there is known a system of cross-authenticating digital identities employing cryptographic process used to authenticate the identity of the "key" held in the customer's card.

However, such an arrangement is not relevant to the manner in which e-commerce services are currently provided.

That is, currently, when a customer uses its web browser to access a "sales" website presented by an e-commerce server, the customer and device are anonymous to the server. An SSL connection is set-up between the browser in the PC or other terminal device used by the customer. The customers can, by using the SSL protocol, verify the authenticity of the server because it is part of a Public Key Infrastructure (PKI) and the server then presents a certificate which chains-back to a root certificate stored in the customer (client) browser. The customer's device can then choose a random value, send it to the server encrypted under its certified public key, and use it as a basis for the computation of symmetric keys used to provide confidentiality and integrity of the information that the customer wishes to send to the server.

As far as the e-commerce server is concerned, this information has come from an anonymous source, and the vendor then seeks authorisation from the credit card company based on creditworthiness, card validity, security checks on supplied billing address etc. However no steps have been taken to authenticate the source of the information by either user authentication or device authentication. The authorisation process is arranged simply to check that it looks like a valid order.

OBJECT AND SUMMARY OF THE INVENTION

In relation to such a known arrangement the present invention seeks to provide for a method and related apparatus and devices, for providing secure internet transaction and having advantages over currently known methods and devices.

According to a first aspect of the present invention, there is provided a transaction card for use at a terminal and for initiating and internet transaction with an SSL-protected server, the card comprising a smartcard including an application arranged for extending an SSL connection from the said protected server into the smart card.

As will be appreciated, this aspect of the present invention advantageously provides an additional layer of protection over and above that provided in the current art through the effective extension of the SSL connection into a customer's card. This serves to protect the information sent by the customer from attempted security-compromising rogue processes arranged to run at the user's terminal, for example keystroke logging software. In effect, the invention provides for an end-to-end secure connection between the customer's smartcard and the remote server arranged to provide e-commerce functionality.

The invention is further advantageous in that it allows for the storing of the root certificates, for the PKI in which the server participates, securely within the card. This advantageously avoids a situation arising in which a customer is tricked into installing fake root certificates by, for example, "phishing", or other semantic attacks. Thereby, the possibility of making subsequent SSL connections to fake websites that might otherwise look authentic can also readily be prevented. Also, while server-side retention of customer details is commonly implemented, such an arrangement is not widely attractive, particularly for small-scale operations. The ease of use offered in accordance with the present invention can also prove advantageous in rendering server-side retention of customer details unnecessary.

Internet-based merchants can also experience advantages since the likelihood of failed transactions by first-time users is greatly reduced.

Yet further, the very fact that potential customers are not part of a specific PKI readily allows such customers to achieve personalisation of a transaction card without the need for registration certificate provision etc.

Advantageously, the application within the smartcard is arranged to offer one of a variety of cryptographic services.

In particular, such cryptographic services can comprise the generation of a pre-master secret from which all symmetric session keys for encryption and authentication can be derived.

Advantageously, the related value therefore never leaves the transaction card in a plain-text format so that such keys are only known to the transaction card and to the server to which an encrypted version of the keys is sent during the initial handshake.

A further cryptographic service is the verification of the certificate (chain) provided by the protected server. In particular, the transaction card is arranged to contain one or more root public keys which serve to anchor the "chain of trust" and thus verify the credentials of the protected server. Advantageously, this prevents unauthorised servers from soliciting card details, since the application on the card can be designed only to supply the account details after the protected server's certificate chain has been verified.

Further, the encryption of the pre-master secret under the server public key can be provided. The result of such encryption is made available to a TLS session manager for onward transmission within the appropriate SSL handshake message.

A further cryptographic service that can be provided by the application within the transaction card is the verification of a Message Authentication Code (MAC). This can be computed on the traffic forming the SSL handshake protocol.

A yet further advantageous feature is the provision of encrypted account details to the protected server and the cryptographic services can include the provision of masked account details in plain text form. That is, it is important not to expose the whole account number since the processes outside the card and running on the terminal device are inherently untrusted and so some digits of the card number are omitted or blanked-out.

In accordance with a particular aspect of the present invention, the transaction card is arranged for use in combination with a specific plug-in for a browser employed in relation to a customer's terminal.

According to another aspect of the present invention, there is provided a terminal arranged for communication with a transaction card substantially as defined above, the terminal including internet browser software and a plug-in therefore arranged to operate in combination with the said application on the transaction card.

The terminal is therefore advantageous in providing for the secure SSL connection between the transaction card and the protected server.

The terminal can be arranged to communicate with the said transaction card by way of electrical contacts, or, if required, in a contactless, manner.

The plug-in as mentioned above is advantageously arranged to ensure that the protected server returns data of a content-type related to that of the said application arranged to run on the smartcard.

As an initial step, the plug-in is advantageously arranged to set up the SSL connection between the transaction card and the protected server.

In particular, the plug-in is arranged to provide for an SSL connection between the transaction card and the protected server, which connection is specific to the required transaction and different, and quite separate, from any other SSL connectivity that might be required.

Yet further, the plug-in can be arranged for confirming card detection to the customer at the terminal.

According to another aspect of the present invention there is provided a method of initiating at an internet terminal an internet transaction with an SSL protected server, including introducing a transaction card at the terminal and initiating an application within the transaction card and which is arranged to extend an SSL connection from the said protected server into the transaction card.

Advantageously, the method can include the step of providing cryptographic services by way of the said application.

As noted above, such cryptographic services can comprise any one or more of, generating a pre-master secret, verifying the certificate (chain) provided by the server, encrypting the pre-master secret under the server public key, verifying a Message Authentication Code (MAC) computed on traffic comprising a SSL handshake protocol, providing user account details encrypted under a symmetric key, and providing masked account details in plain text form.

According to yet a further aspect of the present invention, there is provided an SSL-protected server for receiving an internet transaction request from a terminal as defined above, the server being arranged to return data to the terminal having a content type associated with the said application on the transaction card.

Advantageously, the said server is arranged to offer a hyperlink for selection by way of the terminal so as to initiate the said transaction.

The server is further arranged so as to provide for an SSL connection specific to the said internet transaction.

According to still a further aspect of the present invention, there is provided a method of establishing an internet transaction at an SSL-protected server and in response to a request from a terminal such as that defined above, and including the step of returning data to the said terminal having a content type associated with the said application on the transaction card.

Advantageously, the method includes the step of initiating the transaction subsequent to selection of a hyperlink by way of the terminal.

Yet further, the method can include the provision of an SSL connection which is specific to the said transaction.

Thus, as will be appreciated, through the provision of a smartcard having an appropriate application running thereon, an advantageous method and related terminal device, protected server device and related method can likewise be provided.

Importantly and advantageously, the application is arranged to run on the smartcard so as to allow a customer to supply for example, credit card details, without requiring manual entry via web-forms etc., and to allow for the automatic checking of server SSL certificates within the card itself. This eliminates the possibility of human error and the need for a consumer to understand the security attributes of the SSL connection.

Further, end-to-end encryption of account details between the smartcard and the protected server can be achieved so that data is readily protected from security-compromising rogue processes, such as keystroke loggers, running on the customer's terminal device. Also, a high level of "ease of use" can be achieved such that merchants providing the protected servers do not need to provide a database for storing the account details from previous transactions with a customer, thereby alleviating such databases from security-compromising attacks on their content.

As will be appreciated therefore, the invention, rather than seeking to change current practice by providing mutual authentication between client and server, is based on the current practice of unilateral authentication i.e. of the server by the client, and an enhancement to the security thereof.

The invention can readily inter-operate with existing servers working in accordance with such unilateral authentication practice.

BRIEF DESCRIPTION OF THE DRAWINGS

The invention is described further hereinafter, by way of example only, with reference to the accompanying drawings in which.

DESCRIPTION OF EMBODIMENTS

As will be appreciated from the following, the essential feature of the invention is a special application arranged to run on a customer's smartcard, and, in particular, is arranged for use in conjunction with a dedicated "plug-in" component to the customer's internet browser. These two components are arranged to work together to provide a secure authenticated connection between the card itself and an e-commerce vendor's website, using standard SSL technology. Advantageously, therefore only minor changes to the server systems currently used by such vendors are required to implement the system.

The application which is provided on the card, in accordance with the invention, provides a number of cryptographic services used to set up and operate the SSL connection. Since these cryptographic services are confined to the physical security of the smartcard environment, there is no dependency on trusted components in the customer's PC or other terminal device. Also, since the application in the card is responsible for checking the digital certificate supplied by the vendor's web server, the card will only supply its account details encrypted under the public key of a certified server. By maintaining appropriate control of the certification of servers designed to operate with such suitably enabled payment cards, the card issuer (e.g. the credit card company) can alleviate the burdensome task of the customer checking certificates etc., since the card will perform this task for the customer.

As mentioned above another feature of the invention is the use and invocation of a "plug-in" component to standard internet browser software. The "plug-in" can be invoked whenever the customer selects a hyperlink on the vendor's website and which is dedicated for payment by way of a suitably equipped credit card.

An embodiment of the invention is now described in accordance with steps associated with a typical transaction.

Figure 1:
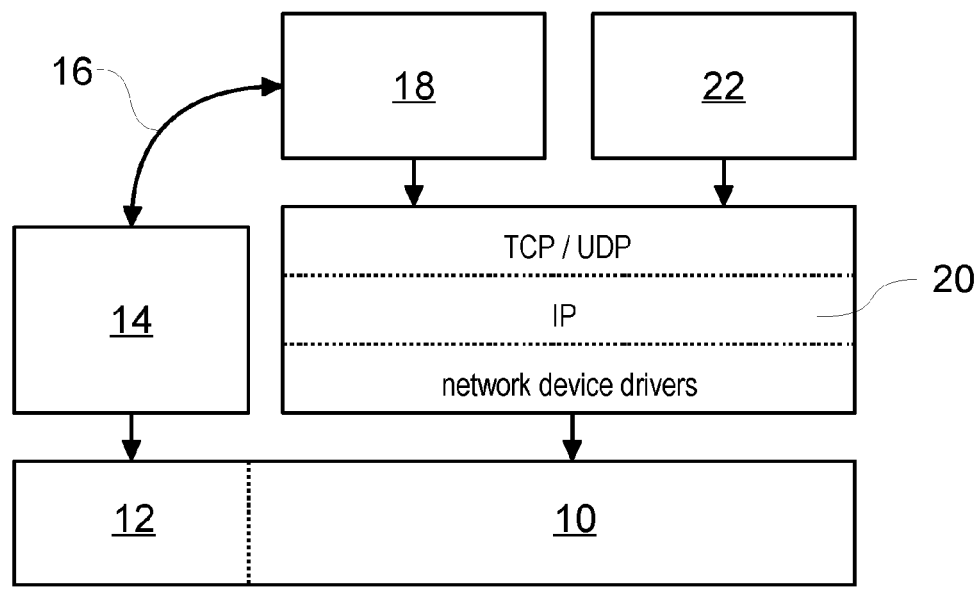
FIG. 1 is a schematic representation of a customer terminal arranged for operation in accordance with one embodiment of the present invention.

As usual, the customer employs a personal computer, set-top box or other internet-connected terminal device which provides a standard internet browser function. Additionally, this device has a card-reader connected to it by way of either contact or contactless technology. Using this equipment, the user browses the vendor website of interest selecting items for purchase and placing them in the online "shopping basket". The architecture of a typical system is illustrated in FIG. 1.

Here there is illustrated terminal hardware 10, presenting a smartcard interface 12, which offers an interface with a smartcard in either a contact or contactless manner. A plug-in 14 is provided and which, upon user selection of the secure connection offered by the invention, can be invoked for use, as illustrated by arrow 16, with the terminal's internet browser 18. As usual, the browser 18 interfaces with TCP/UDP, IP and network driver layers 20, as do other applications 22 not necessarily related to the invention such as a media player application.

When ready to commit to a purchase, the customer clicks on a hyperlink, so as to select the secure connection as noted above, which has a dedicated function designed for this invention e.g. "pay with your smart credit card".

Figure 2:
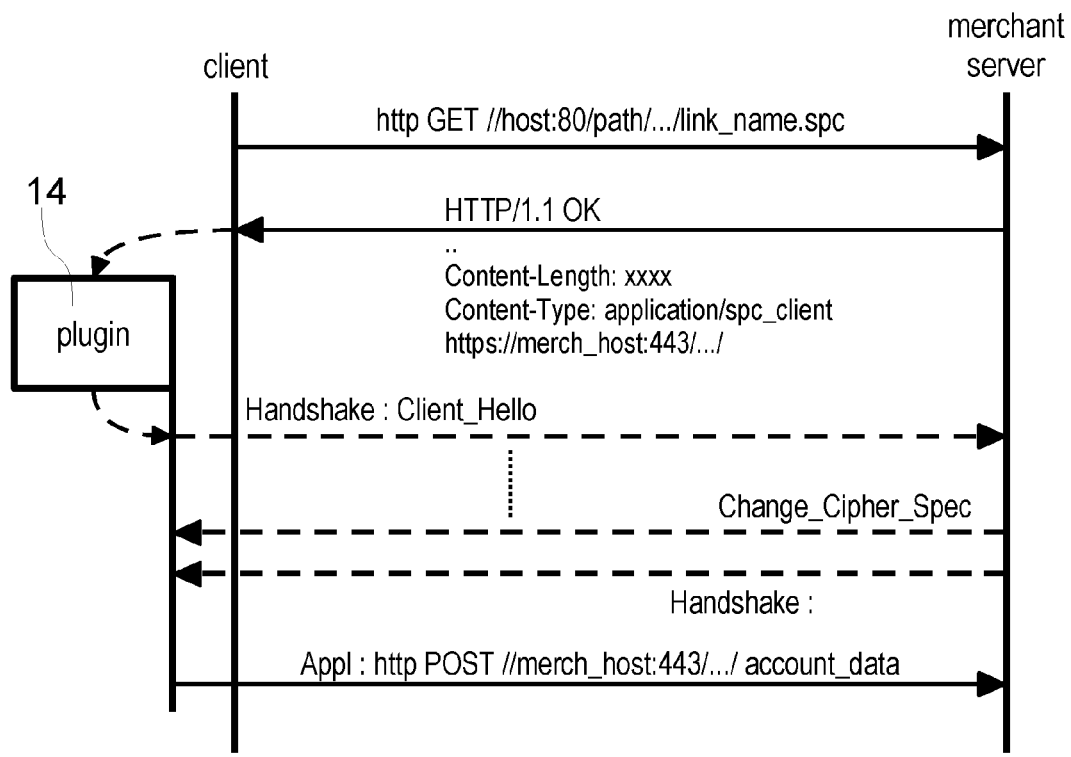
FIG. 2 is a data-exchange diagram illustrating initiation of a secure internet transaction scenario in accordance with an embodiment of the present invention.

Selecting this hyperlink can be arranged to invoke the plug-in component for the customer's browser and which is arranged to function in conjunction with the customer's card to set-up a secure end-to-end connection between the card and the vendor's web-server. This invocation is arranged for by ensuring that the vendor's web-server returns a content type associated with this specific card application. FIG. 2 shows the invocation process in detail.

As can be seen, the selected hyperlink uses a dedicated filetype ".spc" ("smart payment card") which causes the server to return a content type, signalled in the http response header, designed for use with an "spc client". The browser plug-in 14 architecture is arranged to assign this content type to a specific plug-in, and passes the body of the server-response to the plug-in component itself.

The body of the server-response is arranged to simply comprise the url of the server resource to which the plug-in 14 will eventually, by way of http connectivity, POST the account details associated with the card. However, the plug-in must first set-up the SSL connection between the card and the server, since the card represents the origin of the account details and the plug-in 14 itself does not have access to such details. The SSL connection setup process is shown using dotted lines in FIG. 2.

As will be appreciated the architecture of the plug-in 14 component is designed to set-up and conduct a separate SSL connection between the card and website, distinct from any other connections implemented using the browser's own SSL implementation. This architecture is illustrated in FIG. 3.

Figure 3:
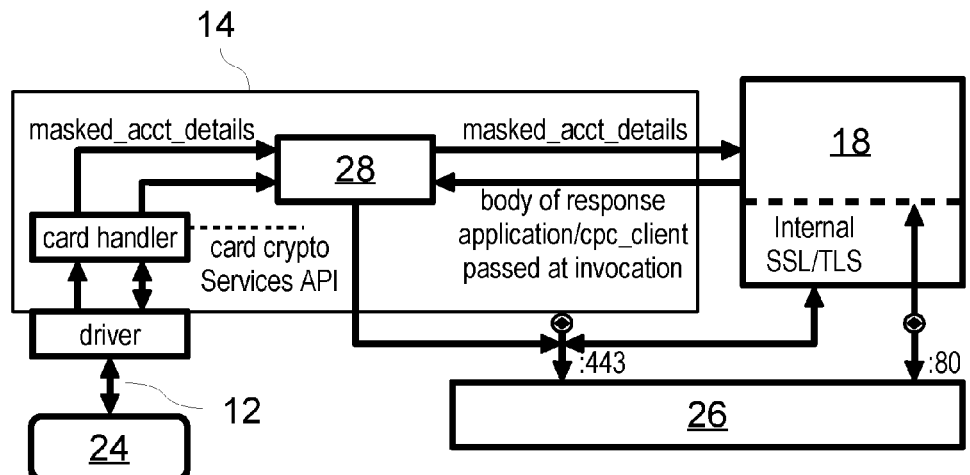
FIG. 3 is a schematic representation of a plug-in arranged to be adopted in relation to an internet browser according to an embodiment of the present invention.

FIG. 3 illustrates a smartcard 24 interfacing via the interface 12 with a driver of the plug-in which in turn interfaces to the browser 18 and a TCP connection 26.

When invoked, the plug-in 14 sets up the TCP connection 26 to the url supplied in the body of the response to the payment hyperlink. As illustrated, this uses port 443, the standard port for http connectivity over SSL. A TLS session manager 28 which comprises the main component within the plug-in 14, uses the card's cryptographic services to conduct the SSL connection handshake, eventually POSTing an encrypted string carrying the account details to the vendor.

The plug-in 14 is also responsible for confirming card detection to the user and such that the card services deliver a set of so called "masked" account details. The card detection confirmation must be in a plain text form for use within the terminal device user interface. On this basis, it is important not to expose the whole account number since the processes outside the card and running on the terminal device are inherently untrusted and so some digits of the card number are omitted or blanked-out.

Figure 4:
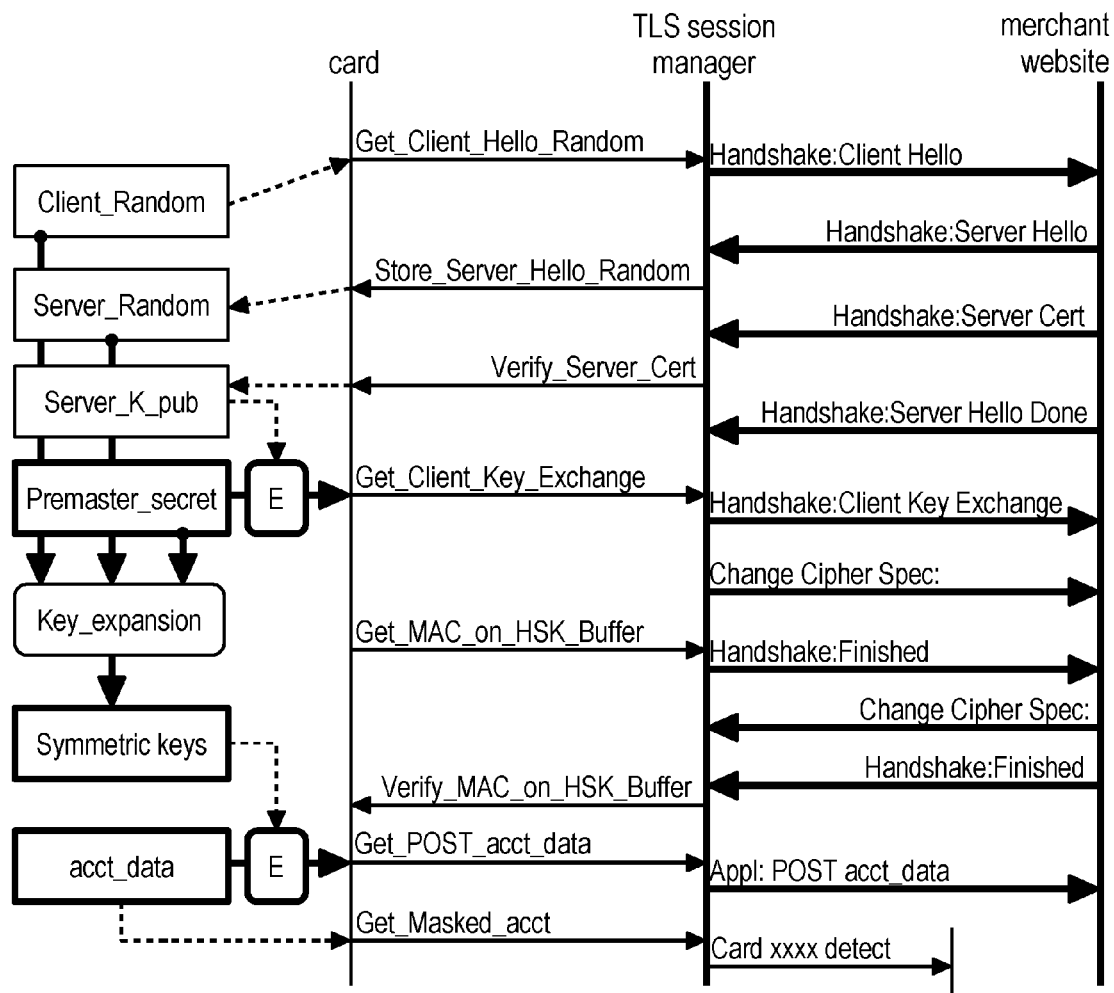
FIG. 4 is a data-exchange diagram illustrating the establishment of an SSL connection between a protected server and smartcard in accordance with an embodiment of the present invention.

The detailed conduct of the SSL handshake and connection usage is illustrated in FIG. 4 below.

From FIG. 4, it can be seen that the card is advantageously responsible for one or more important cryptographic functions.

For example, the generation of a pre-master secret from which all symmetric session keys for encryption and authentication are derived. This value never leaves the card in plain text form so that these keys are only known to the card itself and the server to which an encrypted version is sent in the Handshake: see Client Key Exchange message within FIG. 4.

Verification of the certificate (chain) provided by the server can also be provided. The card has to contain the root public key which serves to anchor the chain of trust and thus verify the credentials of the server. Advantageously this serves to prevent unauthorised servers from soliciting card details, since the application on the card will be designed to supply the account details only after the server's certificate chain has been verified.

The encrypting of the pre-master secret under the server public key and making the result available to the TLS session manager for onward transmission with the appropriate SSL handshake message is another feature that can be provided by the applications see Handshake: Client Key Exchange message within FIG. 4. Since SSL most commonly uses the RSA public key cryptosystem for client key exchange and server certificate formats, verifying the server certificate and encrypting the pre-master secret can be implemented using the computationally inexpensive public key operations intrinsic to that system. Of course other schemes are also possible. This is especially important where the smartcard is contactless and so derives its power from magnetic coupling.

Further, verification of a Message Authentication Code (MAC) computed on the traffic comprising the SSL handshake protocol can be provided to ensure that correct symmetric key agreement with the server has been achieved.

Yet further the account details, encrypted under an agreed symmetric key, for POSTing to the merchant server by the TLS session manager, can be provided as can the masked account details, in plain text form, within the browser plug-in window by the TLS session manager, to provide the customer with positive feedback of card detection. Then when invoked, the plug-in will have prompted the customer to present the payment card, and will either provide positive feedback as described above or display an error message after a suitable timeout if no card is detected.

It should be appreciated that the SSL session conducted with the merchant server uses symmetric keys which are derived using a computation which includes a server-generated random number. This advantageously ensures that captured traffic is replay-immune, since it cannot be used in a subsequent session with the same server, assuming of course randomness of the server-side implementation.

Of course, the invention can be applied to any Internet payment system using contact or contactless smart payment cards, and its essential features applied within set-top boxes and other internet-connected CE devices used as terminal devices.

The invention claimed is:

1. A smartcard having means for communicating with a terminal and means for initiating an internet transaction with an SSL protected server, wherein
the smartcard includes an application stored on the smartcard and arranged to run on the smartcard for extending an SSL connection from the SSL protected server into the smartcard such that upon running the application
an internet transaction with the SSL protected server is initiated at the terminal
an end-to-end SSL connection between the smartcard and the SSL protected server is provided with an e-commerce functionality, wherein
the application is further arranged to operate in combination with a browser plug-in at the terminal to set up and control the end-to-end SSL connection,
wherein the browser plug-in at the terminal comprises a transport layer security (TLS) session manager that manages an SSL handshake with the SSL protected server and wherein the application stored on the smartcard is configured to offer one or more of a plurality of cryptographic services.

2. The smartcard as claimed in claim 1, wherein the cryptographic services include the generation of a pre-master secret from which all symmetric session keys for encryption and authentication can be derived.

3. The smartcard as claimed in claim 1, wherein the cryptographic services include verification of a certificate provided by the SSL protected server.

4. The smartcard as claimed in claim 3, wherein the application is configured to contain one or more root public keys.

5. The smartcard as claimed in claim 1, wherein the application is configured to provide for encryption of a pre-master secret under a server public key.

6. The smartcard as claimed in claim 1, wherein the application is configured to verify a Message Authentication Code computed on traffic forming a SSL handshake protocol.

7. The smartcard as claimed in claim 1, wherein the application is configured to supply credit card details to the protected SSL server without requiring manual entry via a webform.

8. The smartcard as claimed in claim 1, wherein the application is configured to check server SSL certificates within the smartcard itself.

9. The smartcard as claimed in claim 1, wherein SSL functions are partitioned between the application stored on the smartcard and the browser plug-in at the terminal such that browser plug-in at the terminal manages the SSL handshake with the SSL protected server and the application stored on the smartcard provides the one or more cryptographic services.

10. A terminal for communication with a smartcard, the terminal including internet browser software stored on the terminal arranged for initiating an internet transaction with an SSL protected server and a plug-in stored on the terminal, wherein
the plug-in is arranged to operate in combination with an application stored on the smartcard, and
the plug-in comprising a transport layer security (TLS) session manager that is configured to set up and control an end-to-end SSL connection between the smartcard and the SSL protected server via the terminal, wherein the end-to-end SSL connection provides an e-commerce functionality,
a smartcard interface for communicating with the smartcard in a contact, or contactless, manner, wherein cryptographic services are performed by the smartcard and the TLS session manager is configured to communicate cryptographic information between the plug-in at the terminal and the smartcard via the interface.

11. The terminal as claimed in claim 10, wherein the plug-in is arranged to respond to data of a content-type returned by the SSL protected server.

12. The terminal as claimed in claim 10, wherein the plug-in is arranged for confirming card detection to a user of the terminal.

13. A system comprising the terminal as claimed in claim 10, and the SSL protected server having means for receiving an internet transaction request from the terminal, the SSL protected server being arranged to return data to the terminal, the data having a content type associated with the application stored on the smartcard.

14. The terminal as claimed in claim 10, wherein SSL functions are partitioned between the application stored on the smartcard and the browser plug-in at the terminal such that browser plug-in at the terminal manages the SSL handshake with the SSL protected server and the application stored on the smartcard provides the one or more cryptographic services.

15. The terminal as claimed in claim 10, wherein the plug-in is invoked by a dedicated hyperlink, which causes the SSL protected server to return a content type designed for use with the plug-in.

16. A method for implementing an internet transaction with an SSL protected server using a smartcard, the method comprising:
  introducing a smartcard at a terminal,
  initiating an application stored on the smartcard which is arranged to extend an SSL connection from the SSL protected server to the smartcard, by
  running the application stored on the smartcard,
  thereby initiating an internet transaction with the SSL protected server at the terminal,
  providing an end-to-end SSL connection between the smartcard and the SSL protected server with an e-commerce functionality, wherein the end-to-end SSL connection is set up by a browser plug-in of the terminal, which browser plug-in is invoked by the presence of a dedicated hyperlink that causes the SSL protected server to return a content type designed for use with the plug-in, and
  in response to a request from the terminal including the step of
  returning data to the terminal wherein the data have a content type associated with the application stored on the smartcard, and
  providing cryptographic services by way of the application stored on the smartcard.

17. The method as claimed in claim 16, wherein the cryptographic services comprise any one or more of:
  generating a pre-master secret;
  verifying a certificate provided by the server;
  the encrypting a pre-master secret under the server public key;
  verifying a MAC computed on traffic comprising a SSL handshake protocol;
  providing user account details encrypted under a symmetric key; and
  providing masked account details in plain text form.

18. The method as claimed in claim 16, wherein SSL functions are partitioned between the application stored on the smartcard and the browser plug-in at the terminal such that browser plug-in at the terminal manages the SSL handshake with the SSL protected server and the application stored on the smartcard provides the one or more cryptographic services.

* * * * *